UNITED STATES PATENT OFFICE.

JOHN HOWE, OF LOWELL, MASSACHUSETTS.

COMPOSITION TO BE USED FOR INSULATING WIRES.

SPECIFICATION forming part of Letters Patent No. 339,777, dated April 13, 1886.

Application filed December 26, 1884. Renewed September 21, 1885. Serial No. 177,781. (No specimens.)

*To all whom it may concern:*

Be it known that I, JOHN HOWE, a citizen of the United States, residing at Lowell, in the county of Middlesex and Commonwealth of Massachusetts, have invented a certain new and useful Composition to be used for Insulating Wire, of which the following is a specification.

My composition consists of the following ingredients, combined in about the proportions stated, to wit: cotton-seed oil, one quart; asphaltum, (preferably Egyptian,) five pounds; white rosin, four and one-half pounds; refined paraffine-wax, one and one-half pound; Venetian turpentine, two pounds.

First heat the oil nearly to the boiling point, then introduce the other ingredients, and then boil the mixture for about three hours over a quick fire.

The above composition after cooling will be of a waxy consistency in summer, but in winter will need to be heated blood-warm before applying.

The above-described composition is applied by hand to the wires, or by any other usual and convenient means, the wires being first cleaned from dust or other foreign matters.

This composition forms an excellent insulator for wire conductors of electricity, especially underground wires.

I am aware that a composition for insulating wires containing most of the above-named ingredients has been used, and that a patent therefor was granted to Henry Rupert Brissett and myself.

I am not aware that the ingredients of the composition herein described, in the proportions stated, has been used together; and I believe it to be superior to said patented composition in cheapness, cohesiveness, and plasticity.

What I claim, and desire to secure by Letters Patent of the United States, is—

The herein-described composition of matter to be used for insulating wires, consisting of cotton-seed oil, asphaltum, rosin, paraffine-wax, and Venetian turpentine, in substantially the proportions specified.

JOHN HOWE.

Witnesses:
ALBERT M. MOORE,
HERBERT R. WHITE.